United States Patent
Xiang et al.

(10) Patent No.: US 12,003,105 B2
(45) Date of Patent: Jun. 4, 2024

(54) MULTI-CHANNEL GRID-CONNECTED POWER GENERATION SYSTEM AND CONTROL METHOD THEREFOR

(71) Applicant: SUNGROW POWER SUPPLY CO., LTD., Anhui (CN)

(72) Inventors: Guohua Xiang, Hefei (CN); Lin Cheng, Hefei (CN); Jie Ding, Hefei (CN); Nianan Pan, Hefei (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 17/642,113

(22) PCT Filed: Jun. 11, 2020

(86) PCT No.: PCT/CN2020/095501
§ 371 (c)(1),
(2) Date: Mar. 10, 2022

(87) PCT Pub. No.: WO2021/217794
PCT Pub. Date: Nov. 4, 2021

(65) Prior Publication Data
US 2023/0040509 A1     Feb. 9, 2023

(30) Foreign Application Priority Data

Apr. 30, 2020 (CN) .......................... 202010362289.7

(51) Int. Cl.
*H02J 3/10* (2006.01)
*H02J 3/38* (2006.01)
*H02J 13/00* (2006.01)

(52) U.S. Cl.
CPC ............... *H02J 3/10* (2013.01); *H02J 3/381* (2013.01); *H02J 13/00002* (2020.01)

(58) Field of Classification Search
None
See application file for complete search history.

(56) References Cited

U.S. PATENT DOCUMENTS

2012/0261917 A1* 10/2012 Egedal ................... F03D 9/257
290/44
2015/0380942 A1* 12/2015 Premm .................. H02M 7/44
307/52

(Continued)

FOREIGN PATENT DOCUMENTS

CN    102185333 A    9/2011
CN    104242353 A    12/2014

(Continued)

OTHER PUBLICATIONS

International Search Report (in English and Chinese) and Written Opinion of the International Searching Authority (Chinese) issued in PCT/CN2020/095501, dated Jan. 19, 2021; ISA/JP.

(Continued)

*Primary Examiner* — Jared Fureman
*Assistant Examiner* — Joel Barnett
(74) *Attorney, Agent, or Firm* — Harness, Dickey & Pierce, P.L.C.

(57) ABSTRACT

The present application discloses a multi-channel grid-connected power generation system and a control method therefor, which lowers the system cost while reducing no-load losses of all step-up transformers. Multi-channel energy conversion devices in the system are each connected in parallel, by means of a step-up transformer, to the same collector line, one end of the collector line is connected to the grid by means of a switch device, and the on-off switching of the switch device is controlled by a control unit. The control unit sends a switch-off command to the switch device when same has determined that all of the energy conversion devices have entered a non-operating state. In the (Continued)

off state of the switch device, at least one energy conversion device, when meeting a start-up condition, starts to operate as a voltage source, and establishes an alternating-current voltage, so that the phase difference and amplitude difference of voltages at two ends of the switch device are both stable within an allowable error range. Then, the control unit sends a switch-on command to the switch device, and the other energy conversion devices start to operate as a current source to transfer energy to the grid.

11 Claims, 4 Drawing Sheets

(56) References Cited

U.S. PATENT DOCUMENTS

| | | | | |
|---|---|---|---|---|
| 2019/0341781 | A1* | 11/2019 | Marchegiani | H02J 3/46 |
| 2021/0011061 | A1* | 1/2021 | Runge | G01R 19/2513 |
| 2021/0257825 | A1* | 8/2021 | Wulfekuhle | G01R 31/327 |

FOREIGN PATENT DOCUMENTS

| | | |
|---|---|---|
| CN | 104953619 A | 9/2015 |
| CN | 105490308 A | 4/2016 |
| CN | 206211549 U | 5/2017 |
| CN | 206323149 U | 7/2017 |
| CN | 207719822 U | 8/2018 |
| CN | 110429654 A | 11/2019 |
| EP | 2632011 A1 | 8/2013 |
| EP | 3203598 A1 | 8/2017 |
| EP | 3533996 A1 | 9/2019 |
| JP | 2016100918 A | 5/2016 |

OTHER PUBLICATIONS

Extended Search Report in corresponding European Patent Application No. 209330703, dated Jul. 26, 2023.

* cited by examiner

MULTI-CHANNEL GRID-CONNECTED POWER GENERATION SYSTEM AND CONTROL METHOD THEREFOR

This application is a U.S. National Phase Application under 35 U.S.C. 371 of International Application No. PCT/CN2020/095501, filed on Jun. 11, 2020, which claims priority to Chinese Patent Application No. 202010362289.7, titled "MULTI-CHANNEL GRID-CONNECTED POWER GENERATION SYSTEM AND CONTROL METHOD THEREFOR", filed on Apr. 30, 2020, with the China National Intellectual Property Administration, both of which are incorporated herein by reference in their entirety.

FIELD

The present disclosure relates to the technical field of power electronics, and in particular, to a multi-channel grid-connected power generation system and a control method therefor.

BACKGROUND

Figure 1:
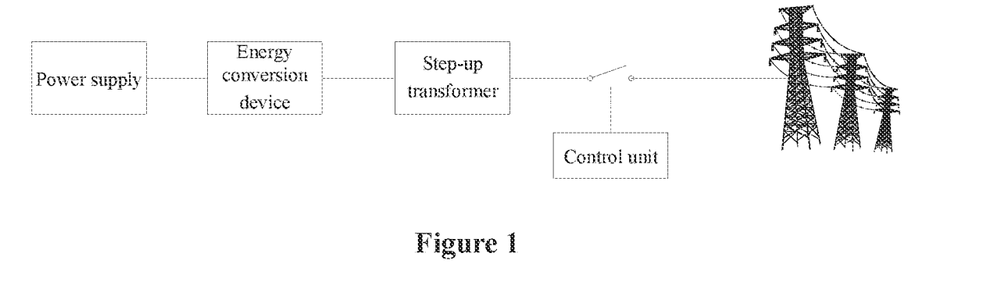
FIG. 1 is a schematic structural diagram of a single-channel grid-connected power generation system according to the prior art.

In some applications, after energy of a front-stage power supply (such as solar energy, wind energy, or battery energy storage, etc.) is converted by an energy conversion device, the converted energy needs to be fed to a power grid through a step-up transformer. In a case of insufficient energy supply of the front-stage power supply, the energy conversion device enters a non-operational state. In this case, if the step-up transformer is still connected to the power grid, a large no-load loss will be generated. For this reason, in the conventional technology, a switching device is added between the step-up transformer and the power grid. The switching device is controlled to be switched on or switched off by a control unit, as shown in FIG. 1. When the energy conversion device is in the non-operational state, the connection between the step-up transformer and the grid is cut off, thereby reducing no-load loss.

Figure 2:
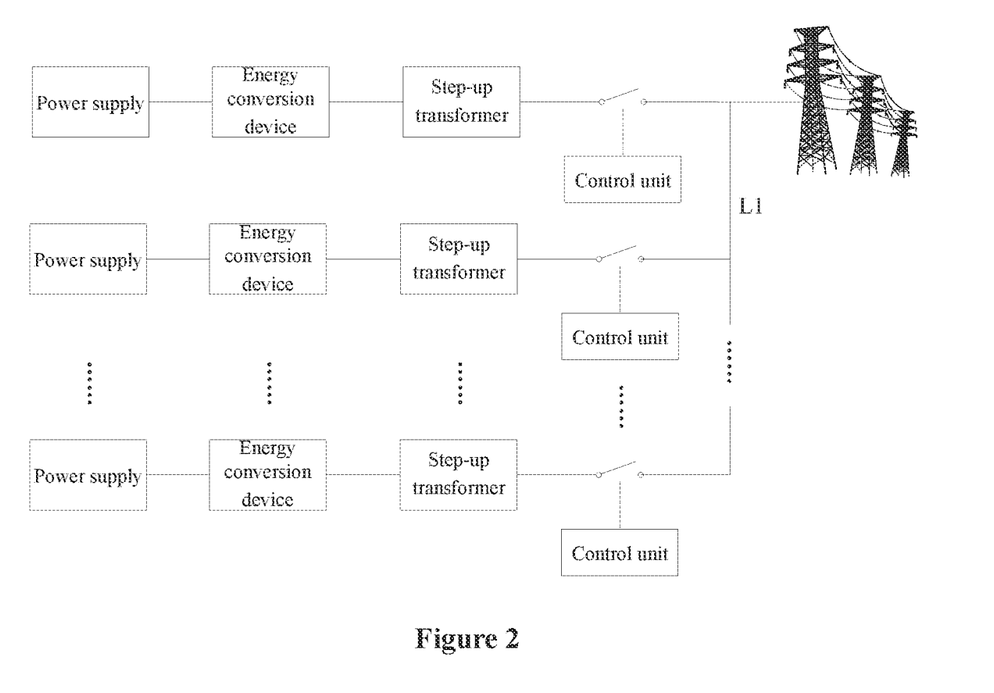
FIG. 2 is a schematic structural diagram of a multi-channel grid-connected power generation system according to the prior art.

The above-mentioned solution of adding switching devices is specifically designed for a single-channel grid-connected power generation system. For a multi-channel grid-connected power generation system, multiple power sources are connected in parallel and each of the multiple power sources is connected to a same collector line L1 through a corresponding energy conversion device and a corresponding step-up transformer to realize power supply to a power grid, as shown in FIG. 2. If one switching device and one control unit are separately provided for each grid-connected branch, the hardware cost of the multi-channel grid-connected power generation system will be too high.

SUMMARY

In view of this, the present disclosure provides a multi-channel grid-connected power generation system and a control method therefor, to reduce the hardware cost of the system on the premise of reducing the no-load loss of each step-up transformer.

A multi-channel grid-connected power generation system is provided in the present disclosure. Multi-channel energy conversion devices are connected in parallel, and each of the multi-channel energy conversion devices is connected to a same collector line through a corresponding step-up transformer. One end of the collector line is connected to a power grid through one switching device, and the switching device is controlled to be switched on or switched off by one control unit. In a case that the control unit determines that each of the multi-channel energy conversion devices is in a non-operational state, the control unit is configured to send a switch-off command to the switching device. In a switch-off state of the switching device, at least one energy conversion device is configured to start to operate as a voltage source to establish an alternating current (AC) voltage in a case that a start-up condition is met, so that a phase difference and an amplitude difference of a voltage across the switching device are both stabilized within an allowable error range; the control unit is configured to send a switch-on command to the switching device; and other energy conversion devices in the multi-channel energy conversion devices other than the at least one energy conversion device are configured to start to operate as a current source to transfer energy to the power grid.

In an embodiment of the present disclosure, the control unit is configured to determine whether an energy conversion device is in the non-operational state by performing information interaction with a centralized control room or said energy conversion device.

In an embodiment of the present disclosure, the phase difference and the amplitude difference of the voltage across the switching device being both stabilized within the allowable error range refers to: a phase and an amplitude of the voltage source maintaining at a preset level. The preset level refers to: a relationship between a phase $\theta_m$ of an output voltage of the voltage source and a phase $\theta_{Tp}$ of a voltage of the power grid satisfies an equation of $\theta_{Tp}=\theta_m+V\theta$, and a relationship between an amplitude $U_m$ of the output voltage of the voltage source and an amplitude $U_{Tp}$ of the voltage of the power grid satisfies an equation of $U_{Tp}=k*U_m$, where $V\theta$ is an allowable phase deviation between voltages at both ends of the switching device, k is a voltage disturbance coefficient, and a value of k is determined by an allowable amplitude deviation between the voltages at both ends of the switching device and a transformation ratio of a step-up transformer on an AC side of the voltage source.

In an embodiment of the present disclosure, during a start-up operation of the voltage source,
  an amplitude and a phase of an actual output voltage of the voltage source are used as feedback for adjusting the amplitude and the phase of the actual output voltage of the voltage source in a closed loop; or
  an amplitude and a phase of an excitation voltage of a step-up transformer connected to the voltage source on a same grid-connected branch are used as feedback for adjusting an amplitude and a phase of an actual output voltage of the voltage source in a closed loop; or
  an amplitude and a phase of an AC side voltage of any one of the other energy conversion devices in the multi-channel energy conversion devices other than the at least one energy conversion device are used as feedback for adjusting an amplitude and a phase of an actual output voltage of the voltage source in a closed loop.

In an embodiment of the present disclosure, the other energy conversion devices in the multi-channel energy conversion devices other than the at least one energy conversion device being configured to start to operate as the current source includes:
  the other energy conversion devices in the multi-channel energy conversion devices other than the at least one energy conversion device being configured to start to operate as the current source before the switching device is switched on; or
  the other energy conversion devices in the multi-channel energy conversion devices other than the at least one energy conversion device being configured to start to operate as the current source after the switching device is switched on; or the other energy conversion devices in the multi-channel energy conversion devices other than the at least one energy conversion device being divided into two groups, one group being configured to start to operate as the current source before the switching device is switched on, and the other group being configured to start to operate as the current source after the switching device is switched on.

In an embodiment of the present disclosure, after the switching device is switched on, the voltage source is configured to switch to the current source and start to operate as the current source.

In an embodiment of the present disclosure, the at least one energy conversion device being configured to start to operate as the voltage source in a case that the start-up condition is met includes:

one of the multi-channel energy conversion devices being configured to start to operate as the voltage source in a case that the start-up condition is met; or each of the multi-channel energy conversion devices being configured to start to operate as the voltage source in a case that the start-up condition is met, and the multi-channel energy conversion devices being standby for each other; or one of the multi-channel energy conversion devices being configured to start to operate as the voltage source first in a case that the start-up condition is met, and once an AC voltage meeting requirements is not established when said energy conversion device operates as the voltage source, the other one or more energy conversion devices as well as said energy conversion device being configured to start to operate as the voltage source in a case that the start-up condition is met.

In an embodiment of the present disclosure, during a start-up operation of the voltage source, an amplitude and a phase of a voltage of the power grid are sampled in real time through a voltage transformer.

In an embodiment of the present disclosure, the voltage transformer is connected between a ring network of the multi-channel grid-connected power generation system and the power grid, and the control unit is a node of the ring network. A method for taking electricity by the ring network includes: taking electricity from the power grid through the voltage transformer.

In an embodiment of the present disclosure, the switching device is a high-voltage contactor or a tap switching device.

A control method for a multi-channel grid-connected power generation system is further provided in the present disclosure. In the multi-channel grid-connected power generation system, multi-channel energy conversion devices are connected in parallel, each of the multi-channel energy conversion devices is connected to a same collector line through a corresponding step-up transformer, one end of the collector line is connected to a power grid through one switching device, and the switching device is controlled to be switched on or switched off by one control unit. The control method includes:

sending, by the control unit, a switch-off command to the switching device in a case that the control unit determines that each of the multi-channel energy conversion devices is in a non-operational state; and in a switch-off state of the switching device:
starting at least one energy conversion device to operate as a voltage source to establish an alternating current (AC) voltage in a case that a start-up condition is met, so that a phase difference and an amplitude difference of a voltage across the switching device are both stabilized within an allowable error range;

sending, by the control unit, a switch-on command to the switching device; and starting other energy conversion devices in the multi-channel energy conversion devices other than the at least one energy conversion device to operate as a current source to transfer energy to the power grid.

It can be seen from the above technical solutions, each grid-connected branch shares one switching device and one control unit, which reduces the cost of system hardware. When the system is connected to the power grid for power generation, the control unit controls the switching device to be switched on after each energy conversion device enters a non-operational state, which cuts off the connection between each step-up transformer and the power grid, thereby reducing the no-load loss of each step-up transformer. After the system is off-grid, at least one energy conversion device starts to operates as a voltage source when a start-up condition is met. In this way, on one hand, the phase and amplitude of the voltage of the collector line are approximately equal to those of the grid voltage, and on the other hand, the amplitude and frequency support of the voltage are provided for the system. Therefore, there will be no current impact when the switching device is switched off, and the system can smoothly return to the grid-connected power generation state, thereby ensuring normal power supply.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described in the following illustrate some embodiments of the present disclosure, other drawings may be obtained by those skilled in the art based on these drawings without any creative efforts.

DETAILED DESCRIPTION

The technical solutions in the embodiments of the present disclosure will be described clearly and completely hereinafter in conjunction with the drawings of the embodiments of the present disclosure. Apparently, the described embodiments are only some of the embodiments of the present disclosure, rather than all embodiments. Any of other embodiments made by the person skilled in the art based on the embodiments in the present disclosure without any creative efforts, fall into the scope of the present disclosure.

Figure 3:
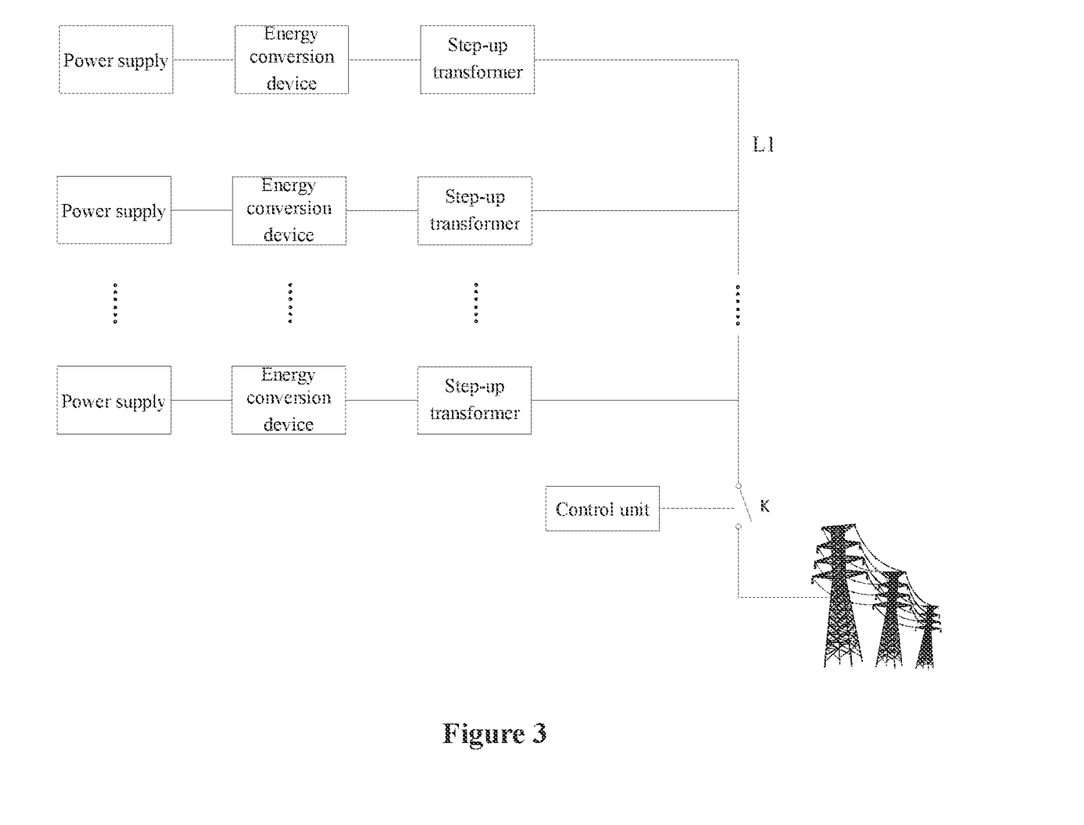
FIG. 3 is a schematic structural diagram of a multi-channel grid-connected power generation system according to an embodiment of the present disclosure.

As shown in FIG. 3, a multi-channel grid-connected power generation system is provided according to an embodiment of the present disclosure. In the system, multi-channel energy conversion devices are connected in parallel, and each of the multi-channel energy conversion devices is connected to a same collector line L1 through a corresponding step-up transformer. One end of the collector line L1 is connected to a power grid through one switching device K, the switching device K may be, for example, a high-voltage contactor or a tap switching device, and the switching device K is controlled to be switched on or switched off by one control unit. The control unit at least participates in the following control logics (1) and (2) in the multi-channel grid-connected power generation system.

(1) The Control Logic in the Grid-Connected State of the System

When the switching device K is in a switch-on state, the multi-channel grid-connected power generation system is in the grid-connected state. In the grid-connected state of the system, the control unit sends a switch-off command to the switching device K if it is determined that each energy conversion device has entered a non-operational state.

Specifically, each energy conversion device has its own control system, as a part of the energy conversion device, said control system is configured to monitor an operating state of a main circuit of the energy conversion device and to perform information interaction with a centralized control room. When energy of a front-stage power supply of the energy conversion device is lower than a preset value required by the energy conversion device, the main circuit of the energy conversion device enters a non-operational state under independent control of its own control system or under centralized control of the centralized control room. The control unit may determine whether each energy conversion device has entered the non-operational state by performing information interaction with said energy conversion device (essentially performing information interaction with a control system of said energy conversion device) of the centralized control room.

After the control unit determines that each energy conversion device has entered the non-operational state by any one of the foregoing methods or other methods, the control unit controls the switching device K to be switched off, to cut off connection between the step-up transformer and the power grid, thus no-load loss of each step-up transformer is reduced, and the overall efficiency of the multi-channel grid-connected power generation system is improved.

(2) The Control Logic in the Off-Grid State of the System

After the control unit controls the switching device K to be switched off, the multi-channel grid-connected power generation system enters an off-grid state. In the off-grid state of the system, at least one energy conversion device starts to operate as a voltage source to establish an alternating current (AC) voltage in a case that a start-up condition is met (the start-up condition is met refers to that the energy of the front-stage power supply of the energy conversion device is not lower than the preset value required by said energy conversion device and the energy conversion device is not prohibited by the centralized control room), so that a phase difference and an amplitude difference of a voltage across the switching device K are both stabilized within an allowable error range. Then, the control unit sends a switch-on command to the switching device, and other energy conversion devices (other energy conversion devices refers to energy conversion device other than the voltage source, where the energy of the front-stage power source of other energy conversion devices is not lower than the preset value required by other energy conversion devices and other energy conversion devices are not prohibited by the centralized control room) start to operate as a current source to transfer energy to the power grid.

Specifically, according to different operating modes, energy conversion devices can be divided into two types: an energy conversion device as a voltage source and an energy conversion device as a current source. The energy conversion device as a voltage source refers to an energy conversion device operating in a voltage/frequency (V/F) mode. The energy conversion device as a voltage source outputs a stable voltage amplitude and frequency when a micro-grid is off-grid (that is, when the micro-grid is not supported by voltage amplitude and frequency of a large grid), and provides voltage amplitude and frequency support for the entire micro-grid. The energy conversion device as a current source refers to an energy conversion device operating in an active power/reactive power (P/Q) mode. The energy conversion device as a current source directly controls output active and reactive power by controlling its own output current when the micro-grid has voltage amplitude and frequency support. In the embodiments of the present disclosure, the multi-channel grid-connected power generation system is the micro-grid, and the micro-grid is connected to a large power grid through the switching device K.

When the phase or amplitude of the voltage at both ends of the switching device K is quite different, a large impact current will be generated at the moment of switching on the switching device K, which will reduce the life of related devices or even damage the devices. In the embodiments of the present disclosure, at least one energy conversion device starts to operate as the voltage source firstly under the condition that the energy of the front-stage power supply of the energy conversion device is sufficient. During the start-up operation of the voltage source, the step-up transformer on the same grid-connected branch is excited, the amplitude and phase of the excitation voltage of the step-up transformer are stabilized at a level that is basically equal to the amplitude and phase of the power grid voltage, and then the control unit controls the switching device K to be switched on, thus no impact current will be generated when closing the switching device K.

When a transformation ratio of the step-up transformer is fixed, the amplitude and phase of the excitation voltage of the step-up transformer are determined by the amplitude and phase of the output voltage of the voltage source. At this time, the amplitude and phase of the excitation voltage of the step-up transformer are stabilized at a level substantially equal to the amplitude and phase of the power grid voltage, that is, the amplitude and phase of the voltage source are stabilized at a preset level. The preset level refers to: a relationship between a phase $\theta_m$ of the output voltage of the voltage source and a phase $\theta_{Tp}$ of a voltage of the power grid satisfies an equation of $\theta_{Tp}=\theta_m+V\theta$, and a relationship between an amplitude $U_m$ of the output voltage of the voltage source and an amplitude $U_{Tp}$ of the voltage of the power grid satisfies an equation of $U_{Tp}=k*U_m$, where $V\theta$ is an allowable phase deviation between the voltages at both ends of the switching device (that is, an allowable phase deviation between the voltages across the switching device K), k is a voltage disturbance coefficient, and a value of k is determined by an allowable amplitude deviation between the voltages at both ends of the switching device (that is, an allowable amplitude deviation between the voltages across the switching device K) and the transformation ratio of the step-up transformer on an AC side of the voltage source.

The process that the voltage source stabilizing the output voltage of the voltage source to the phase $\theta_{Tp}$ ($\theta_{Tp}=\theta_m+V\theta$) is called phase lock. The phase lock is also called as frequency lock since the frequency must be consistent to fix the phase.

During the start-up operation of the voltage source, an amplitude and a phase of an actual output voltage of the voltage source may be used as feedback for adjusting the amplitude and the phase of the actual output voltage of the voltage source in a closed loop; alternatively, an amplitude and a phase of an excitation voltage of a step-up transformer connected to the voltage source on a same grid-connected branch may be used as feedback for adjusting the amplitude and phase of the actual output voltage of the voltage source in the closed loop; alternatively, an amplitude and a phase of an AC side voltage of any one of the other energy conversion devices may be used as feedback for adjusting the amplitude and phase of the actual output voltage of the voltage source in the closed loop, which are not limited in the present disclosure. Since all step-up transformers are connected in parallel on the same collector line L1, after the AC side voltage of the voltage source excites the step-up transformer on the same grid-connected branch, the excitation voltage will excite other step-up transformers, thus, the amplitude and phase of the excitation voltage of any other step-up transformer have a fixed corresponding relationship with the amplitude and phase of the actual output voltage of the voltage source. Therefore, the amplitude and phase of the actual output voltage of the voltage source can be calculated according to the corresponding relationship.

Before the switching device K is switched on, the voltage source provides voltage amplitude and frequency support for the micro-grid. After the switching device K is switched on, an external grid provides voltage amplitude and frequency support for the micro-grid. Thus, it can be seen that whether the switching device K is switched on or not, voltage amplitude and frequency support is provided to the micro-grid. Therefore, the remaining energy conversion devices except the voltage source may start to operate as the current sources before the switching device is switched on; alternatively, the remaining energy conversion devices may start to operate as the current sources after the switching device is switched on; alternatively, the remaining energy conversion devices may be divided into two groups, one group of the remaining energy conversion devices starts to operate as the current sources before the switching device is switched on, and another group of the remaining energy conversion devices starts to operate as the current sources after the switching device is switched on, which are not limited in the present disclosure.

In an embodiment of the present disclosure, the at least one energy conversion device being configured to start to operate as the voltage source in a case that the start-up condition is met includes: one of the multi-channel energy conversion devices starts to operate as the voltage source in a case that the start-up condition is met; alternatively, each of the multi-channel energy conversion devices starts to operate as the voltage source in a case that the start-up condition is met, and the multi-channel energy conversion devices are standby for each other; alternatively, one of the multi-channel energy conversion devices starts to operate as the voltage source first in a case that the start-up condition is met, and once an AC voltage meeting requirements is not established when said energy conversion device operates as the voltage source, the other one or more energy conversion devices as well as said energy conversion device start to operate as the voltage source in a case that the start-up condition is met.

In any one of the above-mentioned embodiments of the present disclosure, after the switching device K is switched on, the micro-grid has voltage amplitude and frequency support provided by the large grid, thus, the voltage source may be switched to a current source and continues to operate to provide active and reactive power for the power grid.

In any one of the above-mentioned embodiments of the present disclosure, the energy conversion device as the voltage source may be a fixed one or more energy conversion devices designated in advance, or one or more energy conversion devices designated randomly, or it may be one or more energy conversion devices that finally win a competition in which all energy conversion devices participate, which is not limited in the present disclosure. The completion may be, for example, a competition to find an energy conversion device has an input side voltage that firstly reaches a working voltage of the energy conversion device, and the energy conversion device is the first energy conversion device winning the competition, and is qualified as a voltage source firstly.

During the start-up operation of the voltage source, the phase and amplitude of the voltage of the power grid should be obtained in real time. In an embodiment of the present disclosure, referring to FIG. 4, the voltage of the power grid may be sampled through a voltage transformer PT connected between the control unit and the power grid.

Figure 4:
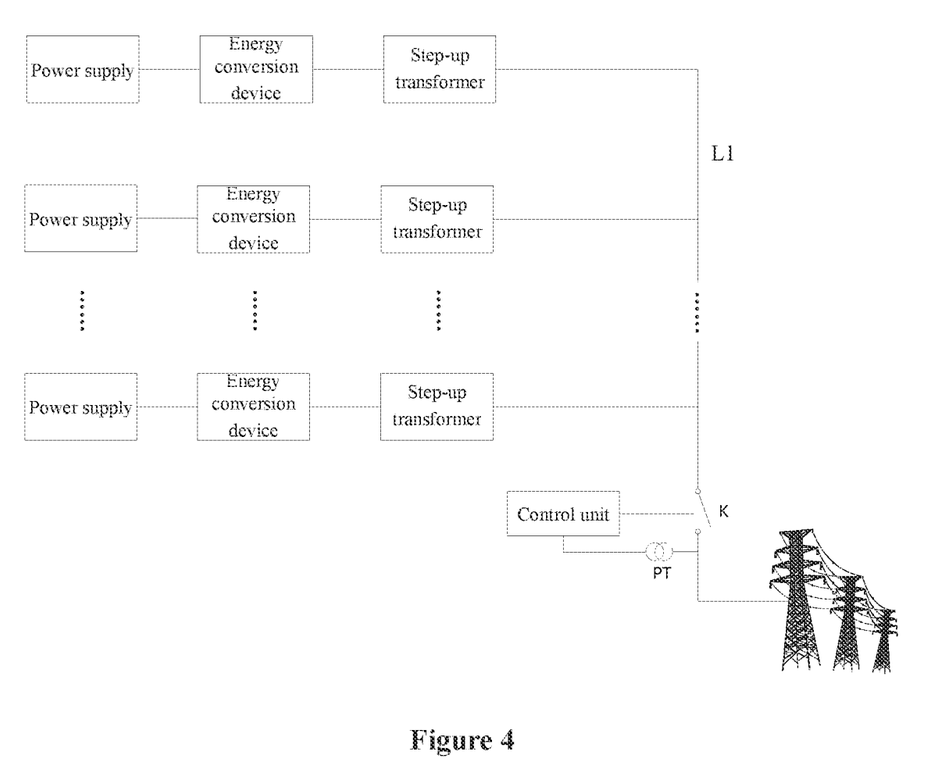
FIG. 4 is a schematic structural diagram of a multi-channel grid-connected power generation system according to another embodiment of the present disclosure.

In any one of the above-mentioned embodiments of the present disclosure, a ring loop of the multi-channel grid-connected power generation system (the control unit and a control system of each energy conversion device are all nodes in the ring loop) may take electricity in the following three ways: (1) taking electricity from an input side of any one or more energy conversion devices; (2) taking electricity from the power grid; (3) taking electricity from both an input side of any one or more energy conversion devices and the power grid, to complement each other.

Considering that the power supply energy is insufficient, the input side voltage of the energy conversion device is quite low. If the above-mentioned electricity-taking method (1) is adopted, the control unit and the control system of each energy conversion device will lose power in this case. The communication links of the entire multi-channel grid-connected power generation system are all broken, and the centralized control room cannot monitor the operation state of the entire multi-channel grid-connected power generation system until the power supply is sufficient, which is undesirable. Therefore, the above-mentioned electricity-taking method (2) and (3) are recommended in the embodiment of the present disclosure. Both the above-mentioned electricity-taking method (2) and (3) can realize uninterrupted power supply to the control unit and the control system of each energy conversion device.

Referring to FIG. 4, the method of taking electricity from the power grid in the above-mentioned electricity-taking method (2) and (3) may refer to that electricity is taken from the power grid through a voltage transformer PT, and the voltage transformer PT has both sampling and communication functions, which saves cost. Other methods such as additional introduction of a power supply transformer used for taking electricity from the power grid can also be used, which is not limited in the present disclosure.

It can be seen from the above technical solutions, each grid-connected branch shares one switching device and one control unit, which reduces the cost of system hardware.

When the system is connected to the power grid for power generation, the control unit controls the switching device to be switched on after each energy conversion device enters a non-operational state, which cuts off the connection between each step-up transformer and the power grid, thereby reducing the no-load loss of each step-up transformer. After the system is off-grid, at least one energy conversion device starts to operates as a voltage source when a start-up condition is met. In this way, on one hand, the phase and amplitude of the voltage of the collector line are approximately equal to those of the grid voltage, and on the other hand, the amplitude and frequency support of the voltage are provided for the system. Therefore, there will be no current impact when the switching device is switched off, and the system can smoothly return to the grid-connected power generation state, thereby ensuring normal power supply.

Figure 5:
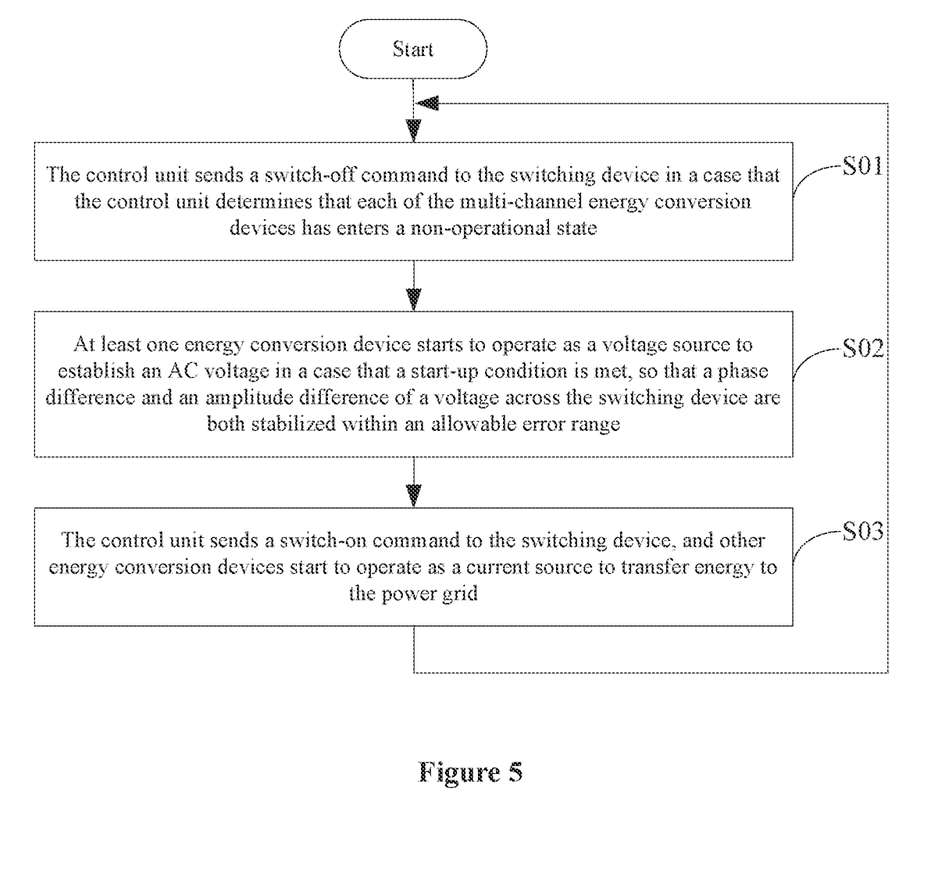
FIG. 5 is a flow chart of a control method for a multi-channel grid-connected power generation system according to an embodiment of the present disclosure.

Corresponding to the foregoing system embodiment, a control method for a multi-channel grid-connected power generation system is also provided according to an embodiment of the present disclosure. In the multi-channel grid-connected power generation system, multi-channel energy conversion devices are connected in parallel, and each of the multi-channel energy conversion devices is connected to a same collector line through a corresponding step-up transformer. One end of the collector line is connected to a power grid through one switching device, and the switching device is controlled to be switched on or switched off by one control unit. Referring to FIG. 5, the control method for the multi-channel grid-connected power generation system includes:

step S01: sending, by the control unit, a switch-off command to the switching device in a case that the control unit determines that each of the multi-channel energy conversion devices has enters a non-operational state;

step S02: starting at least one energy conversion device to operate as a voltage source to establish an AC voltage in a case that a start-up condition is met, so that a phase difference and an amplitude difference of a voltage across the switching device are both stabilized within an allowable error range; and step S03: sending, by the control unit, a switch-on command to the switching device, and starting other energy conversion devices to operate as a current source to transfer energy to the power grid, and then returning to the step S01.

The above embodiments in the specification are described in a progressive manner. Each of the embodiments is mainly focused on describing its differences from other embodiments, and references may be made among these embodiments with respect to the same or similar portions among these embodiments. Descriptions of the apparatus disclosed in the embodiments are simple since the apparatus corresponds to the method disclosed in the embodiments, and related explanations can be found in descriptions of the method.

The term "include", "comprise" or any variant thereof in the specification is intended to encompass nonexclusive inclusion so that a process, method, article or device including a series of elements includes not only those elements but also other elements which have not been listed definitely or an element(s) inherent to the process, method, article or device. Moreover, the expression "comprising a(n) . . . " in which an element is defined will not preclude presence of an additional identical element(s) in a process, method, article or device comprising the defined element(s) unless further defined.

Based on the above description of the disclosed embodiments, those skilled in the art are capable of carrying out or using the present disclosure. It is obvious for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the broadest scope consistent with the principle and novel features disclosed herein.

The invention claimed is:

1. A multi-channel grid-connected power generation system, wherein multi-channel energy conversion devices are connected in parallel, each of the multi-channel energy conversion devices is connected to a same collector line through a corresponding step-up transformer, one end of the collector line is connected to a power grid through one switching device, and the switching device is controlled to be switched on or switched off by one control unit;

wherein in a case that the control unit determines that each of the multi-channel energy conversion devices is in a non-operational state, the control unit is configured to send a switch-off command to the switching device; and wherein in a switch-off state of the switching device, at least one energy conversion device is configured to start to operate as a voltage source to establish an alternating current (AC) voltage in a case that a start-up condition is met, so that a phase difference and an amplitude difference of a voltage across the switching device are both stabilized within an allowable error range, the control unit is configured to send a switch-on command to the switching device, and other energy conversion devices in the multi-channel energy conversion devices other than the at least one energy conversion device are configured to start to operate as a current source to transfer energy to the power grid;

wherein meeting the start-up condition indicates that an energy value of a front-stage power supply of an energy conversion device is not lower than a preset value required by said energy conversion device and said energy conversion device is not prohibited by a centralized control room, and the other energy conversion devices include energy conversion devices of which a corresponding start-up condition is met.

2. The multi-channel grid-connected power generation system according to claim 1, wherein the control unit is configured to determine whether an energy conversion device is in the non-operational state by performing information interaction with the centralized control room or said energy conversion device.

3. The multi-channel grid-connected power generation system according to claim 1, wherein the phase difference and the amplitude difference of the voltage across the switching device being both stabilized within the allowable error range refers to:

a phase and an amplitude of the voltage source maintaining at a preset level;

wherein the preset level refers to: a relationship between a phase $\theta_m$ of an output voltage of the voltage source and a phase $\theta_{Tp}$ of a voltage of the power grid satisfies an equation of $\theta_{Tp}=\theta_m+\Box\theta$, and a relationship between an amplitude $U_m$ of the output voltage of the voltage source and an amplitude $U_{Tp}$ of the voltage of the power grid satisfies an equation of $U_{Tp}=k*U_m$, wherein $\Box\theta$ is an allowable phase deviation between voltages at both ends of the switching device, k is a voltage disturbance coefficient, and a value of k is determined by an allowable amplitude deviation between the voltages at both ends of the switching device and a transformation ratio of a step-up transformer on an AC side of the voltage source.

4. The multi-channel grid-connected power generation system according to claim 3, wherein during a start-up operation of the voltage source,
an amplitude and a phase of an actual output voltage of the voltage source are used as feedback for adjusting the amplitude and the phase of the actual output voltage of the voltage source in a closed loop; or
an amplitude and a phase of an excitation voltage of a step-up transformer connected to the voltage source on a same grid-connected branch are used as feedback for adjusting an amplitude and a phase of an actual output voltage of the voltage source in a closed loop; or
an amplitude and a phase of an AC side voltage of any one of the other energy conversion devices in the multi-channel energy conversion devices other than the at least one energy conversion device are used as feedback for adjusting an amplitude and a phase of an actual output voltage of the voltage source in a closed loop.

5. The multi-channel grid-connected power generation system according to claim 1, wherein the other energy conversion devices in the multi-channel energy conversion devices other than the at least one energy conversion device being configured to start to operate as the current source comprises:
the other energy conversion devices in the multi-channel energy conversion devices other than the at least one energy conversion device being configured to start to operate as the current source before the switching device is switched on; or
the other energy conversion devices in the multi-channel energy conversion devices other than the at least one energy conversion device being configured to start to operate as the current source after the switching device is switched on; or
the other energy conversion devices in the multi-channel energy conversion devices other than the at least one energy conversion device being divided into two groups, one group being configured to start to operate as the current source before the switching device is switched on, and the other group being configured to start to operate as the current source after the switching device is switched on.

6. The multi-channel grid-connected power generation system according to claim 1, wherein after the switching device is switched on, the voltage source is configured to switch to the current source and start to operate as the current source.

7. The multi-channel grid-connected power generation system according to claim 1, wherein the at least one energy conversion device being configured to start to operate as the voltage source in a case that the start-up condition is met comprises:
one of the multi-channel energy conversion devices being configured to start to operate as the voltage source in a case that the start-up condition is met; or
each of the multi-channel energy conversion devices being configured to start to operate as the voltage source in a case that the start-up condition is met, and the multi-channel energy conversion devices being standby for each other; or
one of the multi-channel energy conversion devices being configured to start to operate as the voltage source first in a case that the start-up condition is met, and once an AC voltage meeting requirements is not established when said energy conversion device operates as the voltage source, the other one or more energy conversion devices as well as said energy conversion device being configured to start to operate as the voltage source in a case that the start-up condition is met.

8. The multi-channel grid-connected power generation system according to claim 1, wherein during a start-up operation of the voltage source, an amplitude and a phase of a voltage of the power grid are sampled in real time through a voltage transformer.

9. The multi-channel grid-connected power generation system according to claim 1, wherein the voltage transformer is connected between a ring network of the multi-channel grid-connected power generation system and the power grid, and the control unit is a node of the ring network; and
wherein a method for taking electricity by the ring network includes: taking electricity from the power grid through the voltage transformer.

10. The multi-channel grid-connected power generation system according to claim 1, wherein the switching device is a high-voltage contactor or a tap switching device.

11. A control method for a multi-channel grid-connected power generation system, wherein in the multi-channel grid-connected power generation system, multi-channel energy conversion devices are connected in parallel, each of the multi-channel energy conversion devices is connected to a same collector line through a corresponding step-up transformer, one end of the collector line is connected to a power grid through one switching device, and the switching device is controlled to be switched on or switched off by one control unit;
the control method comprises:
sending, by the control unit, a switch-off command to the switching device in a case that the control unit determines that each of the multi-channel energy conversion devices is in a non-operational state; and
in a switch-off state of the switching device:
starting at least one energy conversion device to operate as a voltage source to establish an alternating current (AC) voltage in a case that a start-up condition is met, so that a phase difference and an amplitude difference of a voltage across the switching device are both stabilized within an allowable error range;
sending, by the control unit, a switch-on command to the switching device; and
starting other energy conversion devices in the multi-channel energy conversion devices other than the at least one energy conversion device to operate as a current source to transfer energy to the power grid;
wherein meeting the start-up condition indicates that an energy value of a front-stage power supply of an energy conversion device is not lower than a preset value required by said energy conversion device and said energy conversion device is not prohibited by a centralized control room, and the other energy conversion devices include energy conversion devices of which a corresponding start-up condition is met.

\* \* \* \* \*